US010814449B2

(12) United States Patent
Chetelat et al.

(10) Patent No.: US 10,814,449 B2
(45) Date of Patent: Oct. 27, 2020

(54) ACCESSORY FOR CENTRING TOOLS ON A MACHINING APPLIANCE, CENTRING METHOD AND CENTRING ASSISTANCE DEVICE COMPRISING SUCH AN ACCESSORY

(71) Applicant: WIBEMO S.A., Rebeuvelier (CH)

(72) Inventors: Clovis Chetelat, Vicques (CH); André Boillat, Moutier (CH)

(73) Assignee: WIBEMO S.A., Rebeuvelier (CH)

( * ) Notice: Subject to any disclaimer, the term of this patent is extended or adjusted under 35 U.S.C. 154(b) by 217 days.

(21) Appl. No.: 16/092,101

(22) PCT Filed: Apr. 18, 2016

(86) PCT No.: PCT/EP2016/058537
§ 371 (c)(1),
(2) Date: Oct. 8, 2018

(87) PCT Pub. No.: WO2017/182049
PCT Pub. Date: Oct. 26, 2017

(65) Prior Publication Data
US 2019/0091823 A1    Mar. 28, 2019

(51) Int. Cl.
*B23Q 17/22*      (2006.01)
*B23B 25/06*      (2006.01)
*G01B 5/25*       (2006.01)

(52) U.S. Cl.
CPC .......... *B23Q 17/2275* (2013.01); *B23B 25/06* (2013.01); *G01B 5/25* (2013.01)

(58) Field of Classification Search
CPC ........ B23Q 17/2275; B23B 25/06; G01B 5/25
(Continued)

(56) References Cited

U.S. PATENT DOCUMENTS 4,297,925 A * 11/1981 Ishizuka ................. B23B 3/161
408/35
4,516,328 A *  5/1985 Massey ................... G01B 5/252
33/412
(Continued)

FOREIGN PATENT DOCUMENTS

EP    2390622 A1   11/2011
EP    2546025 A1    1/2013
(Continued)

OTHER PUBLICATIONS

International Search Report dated Jan. 16, 2017, issued in corresponding International Application No. PCT/EP2016/058537, filed Apr. 18, 2016, 5 pages.
(Continued)

*Primary Examiner* — Christopher W Fulton
(74) *Attorney, Agent, or Firm* — Christensen O'Connor Johnson Kindness, PLLC

(57) ABSTRACT

The present disclosure relates to an accessory for centering a tool or a tool-holder spindle on an axis of rotation X-X' of a rotating guide bush of a machining appliance, wherein it includes a straight body with longitudinal axis F-F' including, at a first end, an alignment member for aligning said axis F-F' with the axis X-X' of the rotating guide bush and, at a second end, a head mounted rotatably mobile about the axis F-F' and including a positioning member capable of receiving a positioning tool, in particular a measurement probe. The disclosure likewise relates to a centering method using such an accessory and a centering device including same.

17 Claims, 5 Drawing Sheets

(58) Field of Classification Search
USPC .......... 33/644, 412, 520, 529, 533, 632, 642
See application file for complete search history.

(56) References Cited

U.S. PATENT DOCUMENTS

| | | | | |
|---|---|---|---|---|
| 4,578,869 | A * | 4/1986 | O'Brien | G01B 5/25 33/533 |
| 4,752,166 | A * | 6/1988 | Lehmkuhl | G01B 5/012 33/504 |
| 5,222,306 | A * | 6/1993 | Neumann | G01B 5/25 29/272 |
| 5,590,474 | A * | 1/1997 | Lamb | B25B 27/16 29/271 |
| 5,647,137 | A * | 7/1997 | McMurtry | B23Q 1/4876 192/139 |
| 5,920,999 | A * | 7/1999 | Hutter | B25B 27/16 33/412 |
| 5,970,621 | A * | 10/1999 | Bazydola | H01L 21/67259 33/533 |
| 6,151,793 | A * | 11/2000 | Carlen | G01B 5/252 33/412 |
| 8,997,365 | B2 * | 4/2015 | Alexander | G01B 5/25 33/645 |
| 2002/0133960 | A1 * | 9/2002 | Cross | G01B 5/24 33/412 |
| 2009/0183610 | A1 * | 7/2009 | Maxted | G05B 19/401 82/1.11 |

FOREIGN PATENT DOCUMENTS

| | | |
|---|---|---|
| EP | 2835702 A1 | 2/2015 |
| JP | H11291121 A | 10/1999 |
| JP | H11320340 A | 11/1999 |
| JP | 2006188073 A | 7/2006 |
| JP | 2012206231 A | 10/2012 |
| WO | 2013/007316 A1 | 1/2013 |

OTHER PUBLICATIONS

Written Opinion of the International Searching Authority dated Jan. 16, 2017, issued in corresponding International Application No. PCT/EP2016/058537, filed Apr. 18, 2016, 4 pages.

International Preliminary Report on Patentability dated Oct. 23, 2018, issued in corresponding International Application No. PCT/EP2016/058537, filed Apr. 18, 2016, 1 page.

* cited by examiner

ACCESSORY FOR CENTRING TOOLS ON A MACHINING APPLIANCE, CENTRING METHOD AND CENTRING ASSISTANCE DEVICE COMPRISING SUCH AN ACCESSORY

TECHNICAL FIELD

The present invention relates to the technical field of machining of parts made of metals and/or synthetic materials. It more particularly relates to an accessory for centering tools on machining appliances with a rotating guide bush such as computer numerical control tours, a tool centering device equipped with such an accessory and an associated centering method.

BACKGROUND OF THE INVENTION

In the field of machining parts for high-precision industries such as horology, electronics or even the medical field, efforts are made to machine extremely small parts, the functionality of which is very closely linked to the dimensional precision, and therefore the machining precision. This machining precision in particular, or even essentially, depends on the positioning of the machining appliances, and in particular their centering relative to the rotation axis of the rotating guide bush of the machining appliances used for the machining operations.

The centering of the machining appliances on the axis of the rotating guide bush makes it possible to define as precise a reference position as possible, from which movements of the tools are calculated with respect to the parts to be machined. Any offset of the machining tools with respect to the rotation axis of the rotating guide bush bearing them may create defects on the machined parts, even of just a one-hundredth of a millimeter, but which are incompatible with the required quality and precision for these parts, causing rejects and financial losses for the manufacturer.

Furthermore, the off-centering of the tools, in particular such as bits, causes significant mechanical stresses within said tools that often lead to premature breakage, with the corresponding costs and inconveniences related to replacing said tools and production planning for the manufacturer.

Various centering methods and related devices have already been proposed in the state of the art in order to reduce or eliminate tool centering defects on the rotating guide bushes of machining appliances and the associated consequences, as previously described.

The Applicant has in particular proposed a centering method and the associated device in application WO 2013/007316 A1.

Said method and centering device are fully satisfactory regarding the centering precision of the tools on the machining appliances. However, the implementation of the method requires a certain experience and manual precision from the operators, in particular for the positioning operations of the measuring probe on the rotating guide bush relative to the tools to be centered, reserving its use for a limited number of operators trained beforehand on the use of the device and its implementation.

BRIEF DESCRIPTION OF THE INVENTION

The present invention aims to provide a simplified solution for carrying out the centering method known from the prior art.

To that end, according to a first object, the invention relates to an accessory for centering a tool or a tool-holder spindle in a rotating guide bush around a fixed axis X-X' of a machining appliance, characterized in that it comprises a straight body with longitudinal axis F-F' comprising, at a first end, an alignment member for aligning said axis F-F' with the axis X-X' of the rotating guide bush and, at a second end, a head mounted rotating around the axis F-F' and comprising a positioning member able to receive a positioning tool, in particular a measuring probe.

This centering accessory has the advantage of greatly facilitating the position of the positioning tool, such as a measuring probe, on the machining appliance in reference to the rotation axis X-X' of its rotating guide bush on which a machining appliance must be centered, then positioning the probe very precisely, without offset relative to said axis, in different measuring and/or adjusting positions relative to the machining appliance.

In one embodiment, the head comprises an alignment shaft on the axis F-F' of the body, said shaft being secured with the positioning member and able to be inserted into a blind bore with complementary dimensions formed along the axis F-F' at the second end of the body.

In one embodiment, the head and the second end of the body comprise reversible connecting means such that the head is removable from said second end of the body.

In one embodiment, the reversible connecting means comprise at least one deformable key and at least one recess for inserting said key, said deformable key and said recess being arranged respectively on the head and the second end of the body or vice versa.

In one embodiment, the head comprises an intermediate cylindrical shoulder between the alignment shaft and the support member, said shoulder having an outer diameter larger than the outer diameter of the shaft, and in that the body comprises an intermediate spot facing between an open end of the bore and the second end of the body, said spot facing being such that said shoulder penetrates at least partially in said spot facing when the head is mounted at the second end of the body.

In one embodiment, the reversible connecting means are arranged in an outer cylindrical surface of the shoulder and an inner cylindrical surface of the spot facing.

In one embodiment, the reversible connecting means comprise at least one ball key deformable perpendicular to a shared axis of revolution of the shaft and the shoulder of the head and at least one recess for inserting said key formed in an inner cylindrical surface of the spot facing, or vice versa.

In one embodiment, the ball key comprises a ball mounted suspended on a spring in a piercing perpendicular to the shared axis of the shaft and the shoulder of the head, the outer diameter of the emerging end of said piercing aligned with the outer cylindrical surface of the shoulder being reduced so as to allow a partial protrusion of the ball at the surface of said shoulder.

In one embodiment, the accessory of the invention comprises a plurality of deformable keys distributed in a regular angular arrangement on the surface of the shoulder and a corresponding plurality of recesses for each of the keys formed in the inner cylindrical surface of the spot facing of the body.

In one embodiment, the at least one recess is formed by an annular groove with axis F-F' in the inner cylindrical surface of the spot facing of the body.

In one embodiment, the positioning member comprises a stop plate against the second end of the body and a shimming housing for one said positioning tool.

In one embodiment, the shimming housing is formed in a finger secured to the stop plate and extending perpendicular thereto.

In one embodiment, the centering accessory according to the invention further comprises means for adjusting the angular position of the head on the body around the axis F-F', in particular at least one graduated scale and a slider formed across from one another respectively on the body and the head, or vice versa.

A second object of the invention also relates to a method for centering a tool or a tool-holder spindle on the rotation axis X-X' of a rotating guide bush of a machining appliance using a centering accessory as previously defined. This method consists of:

a) fastening a measuring probe, in particular for distances, in the member for positioning the head of the centering accessory, b) inserting the body of the accessory into the tool-holder spindle, c) moving the tool-holder spindle to bring the measuring probe across from a benchmark on the rotating guide bush, d) moving the head of the accessory to place the measuring probe in n successive measuring positions that are equidistant from one another, n being an integer greater than 1 and performing a distance measurement between the probe and the benchmark in each position, e) determining the necessary movements relative to the axis X-X' along 3 orthogonal axes based on values acquired during n measurements such that the axis F-F' of the body of the accessory is aligned with the axis X-X', f) adjusting the position of the tool-holder relative to the axis X-X' based on movements determined in step e).

Advantageously, during the implementation of the method according to the invention, the probe is connected to an electronic measuring and control device, if applicable able to be connected to the electronic control system of the machining appliance in order to control the positioning adjustment of the tool automatically after each measurement.

According to a third object, the invention also relates to a device for assisting with the centering of a tool on a rotating guide bush of a machining appliance including a centering accessory according to the invention as previously defined, a measuring probe able to be positioned on the positioning member of the head of the tool, and an electronic measuring device cooperating with the measuring probe to process the values measured by said measuring probe.

BRIEF DESCRIPTION OF THE DRAWINGS

Other features of the present invention will appear more clearly upon reading the following description, done in reference to the appended drawing, provided as a non-limiting example, in which.

DETAILED DESCRIPTION OF THE INVENTION

The invention will be described below more particularly in connection with the centering of piercing tools, end tools, drill spindles or drill counter-spindles borne by a tool-holder spindle of a machining appliance on the rotation axis of a rotating guide bush of said machining appliance, such as a digital lathe. In order to simplify the presentation, reference will be made in the continuation of the description to tools that should be understood broadly, i.e., in particular as including the aforementioned examples.

Figure 1:
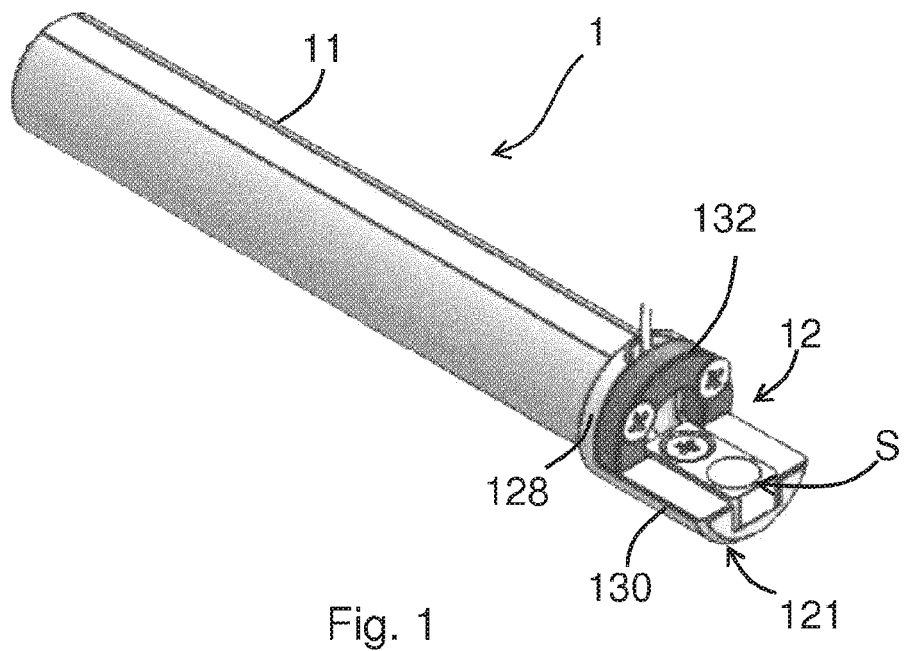
FIG. 1 is a schematic illustration of an example embodiment of the centering accessory according to the invention, in perspective view.
Figure 2A:
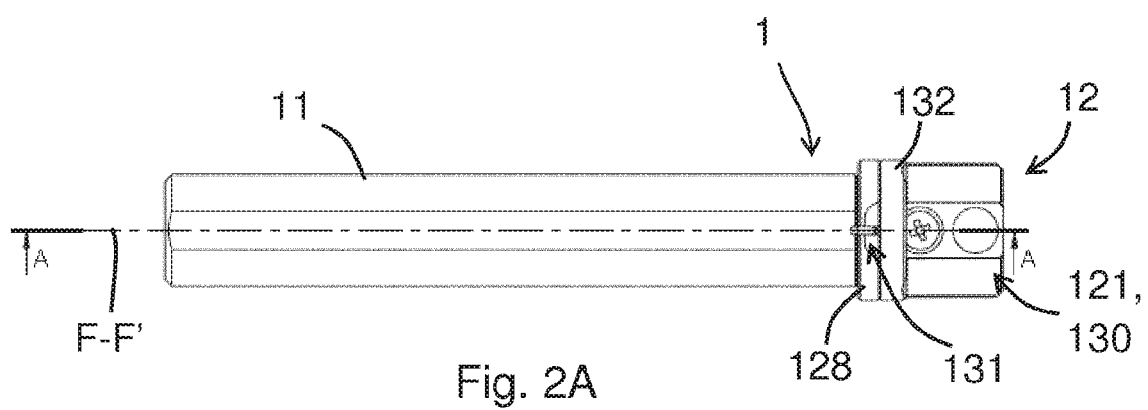
FIGS. 2A and 2B respectively show, in top view and longitudinal sectional view, the centering accessory according to the invention of FIG. 1.
Figure 2B:
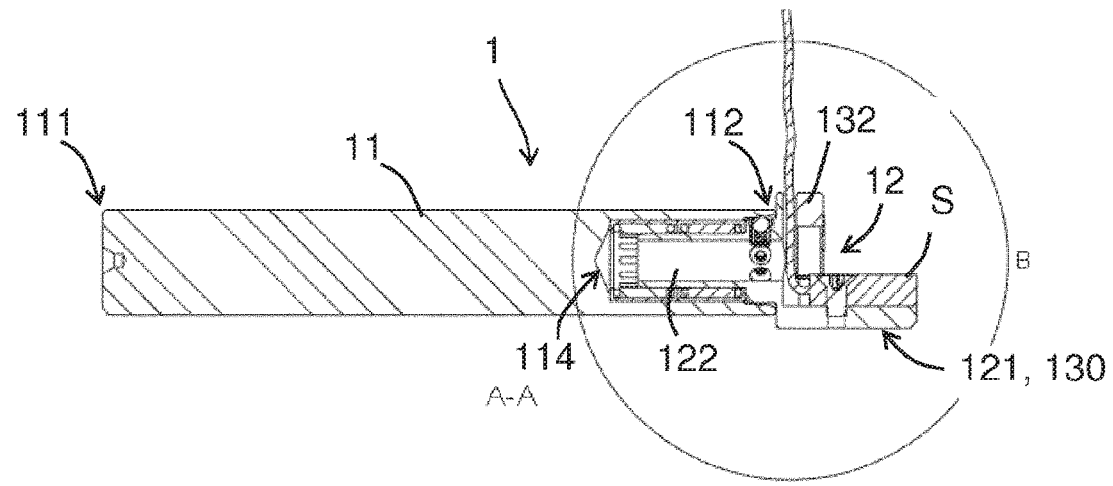

The present invention advantageously proposes a centering accessory 1 as shown in FIGS. 1, 2A and 2B in one preferred example embodiment.

The centering accessory 1 comprises a body 11 elongated along a longitudinal axis F-F' intended to be inserted into a tool-holder bore of a machining accessory in place of a tool or a tool-holder spindle that one wishes to center relative to the rotation axis of the rotating guide bush of the machining appliance.

Figure 4A:
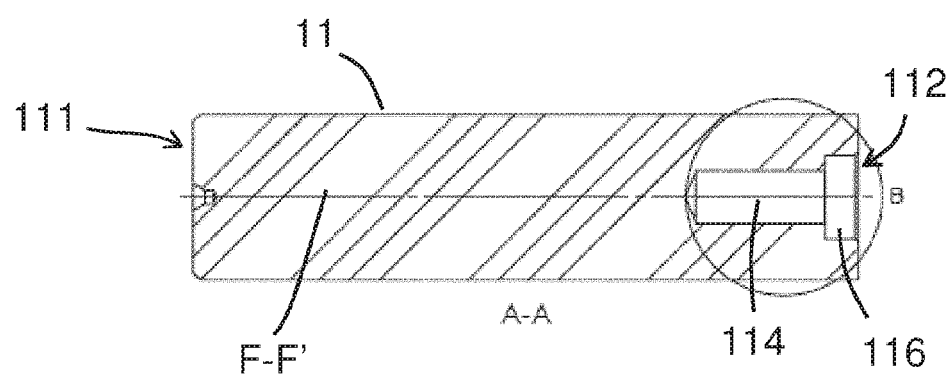
FIG. 4A is a longitudinal sectional view of the body of the centering accessory according to the invention and FIG. 4B is an enlargement of FIG. 4A in line with the coupling bore of the head on the body.
Figure 4B:
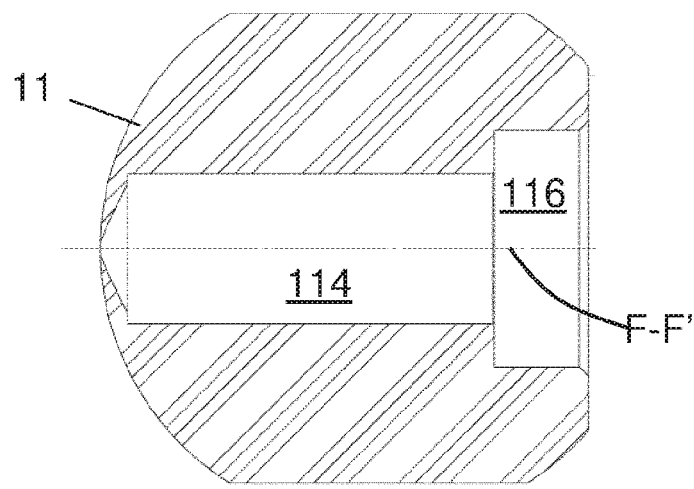

The body 11 is made up of a metal cylinder with longitudinal axis F-F' on the surface of which a flat is formed extending over the entire length of the cylinder between a first end 111 and a second end 112 of the body 11. As shown in FIGS. 4A and 4B, a blind bore 114 with diameter dc1 is formed along the axis F-F' of the body 11 at the second end 112 thereof, the emerging orifice of said bore 114 being made up of a spot facing 116 with diameter dc2 larger than dc1.

Figure 3A:
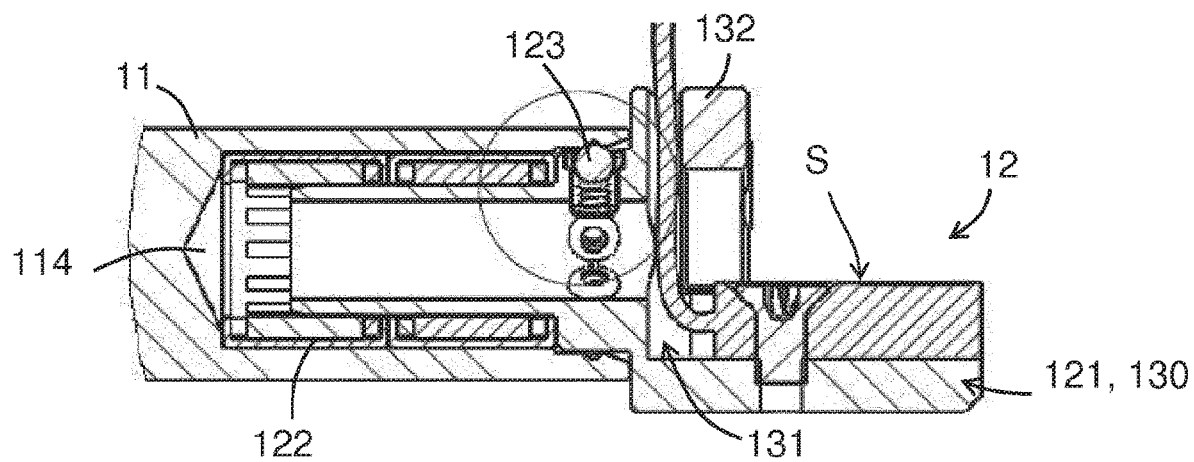
FIG. 3A shows an enlargement of FIG. 2B at the connection between the head and the body of the accessory according to the invention.
Figure 5A:
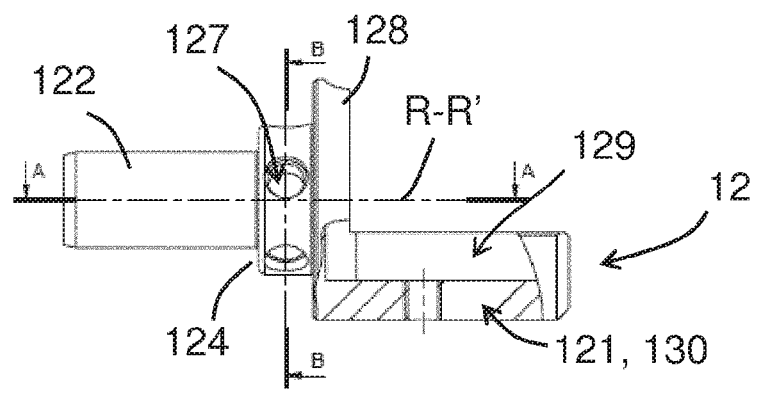
FIG. 5A is a cutaway side view of the head of the centering accessory according to the invention.
Figure 5B:
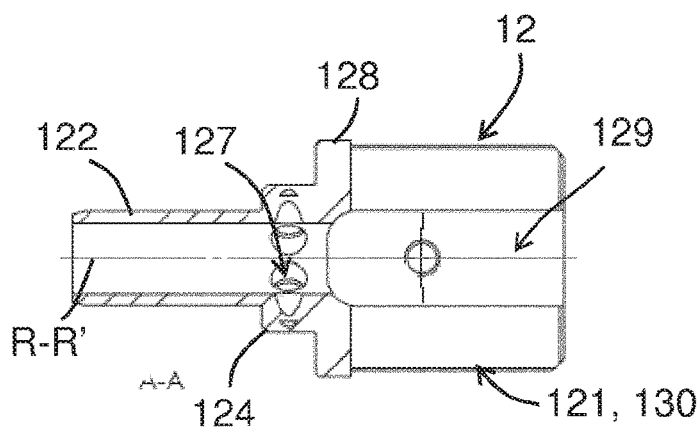
FIG. 5B is a longitudinal sectional view in a median horizontal plane of this head and FIG. 5C is a cross-section along a vertical plane perpendicular to the cutting plane of FIG. 5B in line with a shoulder 124 of the head of the accessory according to the invention.
Figure 5C:
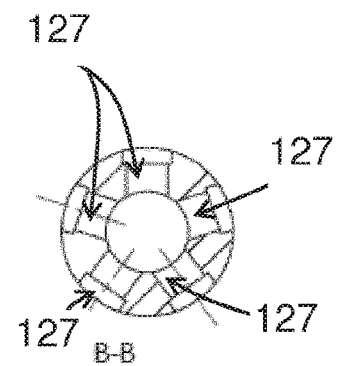

In reference to FIGS. 1 to 3A, a head 12 is mounted rotating at the second end 112 of the body 11 so as to be able to pivot freely around the longitudinal axis F-F' of the body. As shown in FIGS. 3A, 5A and 5B in particular, this head 12 comprises a shaft 122 for alignment and insertion into the bore 114 of the body 11 and a positioning member 121 capable of receiving a positioning tool, in particular a measuring probe S. The outer diameter dt1 of the shaft 122 is substantially equal to the diameter dc1 of the bore, such that there is no play between the body 11 and the head 12 after insertion of the shaft 122 into the bore 114. A shoulder 124 with outer diameter dt2 substantially equal to the diameter dc2 of the spot facing 116 is formed materially between the positioning member 121 and the shaft 122 such that said shoulder 124 completely penetrates the spot facing 116 during the insertion of the head 12 on the body 11, said head abutting against the end 112 of the body 11 on a plate 128 of the positioning member 121, as shown in detail in FIG. 3A.

In the example shown in the figures, the positioning member 121 assumes the form of a finger 130 extending perpendicular to the abutment plate 128 of the head 12. The finger 130 advantageously comprises a hollow or housing 129 centered on the longitudinal axis R-R' of the head 12. This hollow 129 has a shape preferably suitable for positioning and stably wedging a measuring tool therein, such as a measuring probe S, in particular a probe S for measuring distances made up of an inductive detector. This measuring probe S is preferably associated with a measuring device as described in WO 2013/007316 A1 in order to center a tool across from the machining appliance rotating guide bush, as will be described hereinafter.

In the example shown in the figures, the measuring probe S adopts a substantially parallelepiped general shape and the hollow adopts a corresponding rectangular section. However, it is understood that the probe S and the hollow 129 may have any other shape, only the match or compatibility of their mutual shapes being necessary to guarantee stable maintenance of the probe S in the hollow 129.

Furthermore, the positioning member 121 may also, if necessary, adopt a structure other than a finger 130 as shown in the figures, in particular for example a resilient jaw structure between which the probe S can be wedged and held.

Furthermore, as in particular visible in FIGS. 1 to 3A, a trough 131 for the passage of a connecting cable of the probe S can be arranged in the plate 128 so as not to disrupt the acquisition of measurements using said probe. Advantageously, a strap 132 for blocking the probe cable in the trough 131 may be fastened using any appropriate means on the plate 128.

According to the invention, the head 12 and the body 11 comprise reversible connecting means 115, 123 such that the head 12 is removable from the second end 112 of the body 11. In one preferred embodiment shown in FIGS. 2B to 5C, said reversible connecting means comprise at least one deformable key 123 arranged in the shoulder 124 of the head 12 and at least one recess 115 at the second end 112 of the body, in particular in the inner cylindrical wall of the spot facing 116.

Preferably, the head 12 comprises a plurality of deformable keys 123 distributed in a regular angular arrangement (FIG. 5A to 5C) on the surface and in the shoulder 124 and a corresponding plurality of recesses 115 for each of the keys formed in the inner cylindrical surface of the spot facing of the body.

In order to simplify the embodiment, an annular groove 115 [that] may make up the recess in the inner cylindrical wall of the spot facing 116 in order to procure the coupling with the keys 123 of the head is formed by an annular groove with axis F-F' in the inner cylindrical surface of the spot facing 116.

Figure 3B:
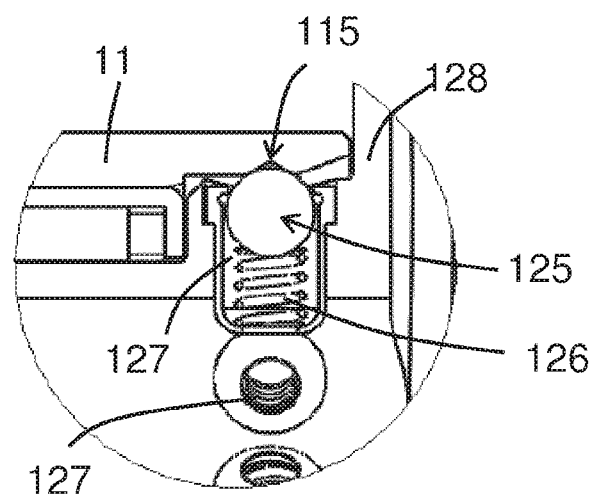
FIG. 3B shows an enlargement of FIG. 3A providing a detailed view of the cooperation of a ball key of the head of the centering accessory in a groove formed in the body of said accessory to provide coupling of the head on the body.

In the preferred embodiment shown in the figures, in particular in FIG. 3B, each of the keys 123 is made up of a ball key 125 mounted suspended on a spring 126 in a piercing 127 perpendicular to the shared axis of revolution R-R' of the shaft 122 and the shoulder 124 of the head 12. The outer diameter of the emerging end of the piercing 127 aligned with the outer cylindrical surface of the shoulder 124 is advantageously reduced, for example by a resilient ring of the circlips type or more simply an annular stopper so as to allow a partial protrusion of the ball 125 on the surface of said shoulder 124.

Lastly, in one advantageous embodiment, the centering accessory 1 according to the invention may comprise means for adjusting the angular position of the head 12 on the body 11 around the longitudinal axis F-F' of the latter, for example made up of at least one graduated scale and a slider or a second graduated scale formed across from one another respectively on the body 11 and the head 12, or vice versa.

Such means for adjusting the angular position may prove particularly useful during the implementation of the accessory 1 for tool centering operations in order to simplify the acquisition of regular rotational positions of the head 12 to acquire the necessary measurements for centering calculations according to a method similar to that described in WO 2013/007316 A1 and described below.

Figure 6:
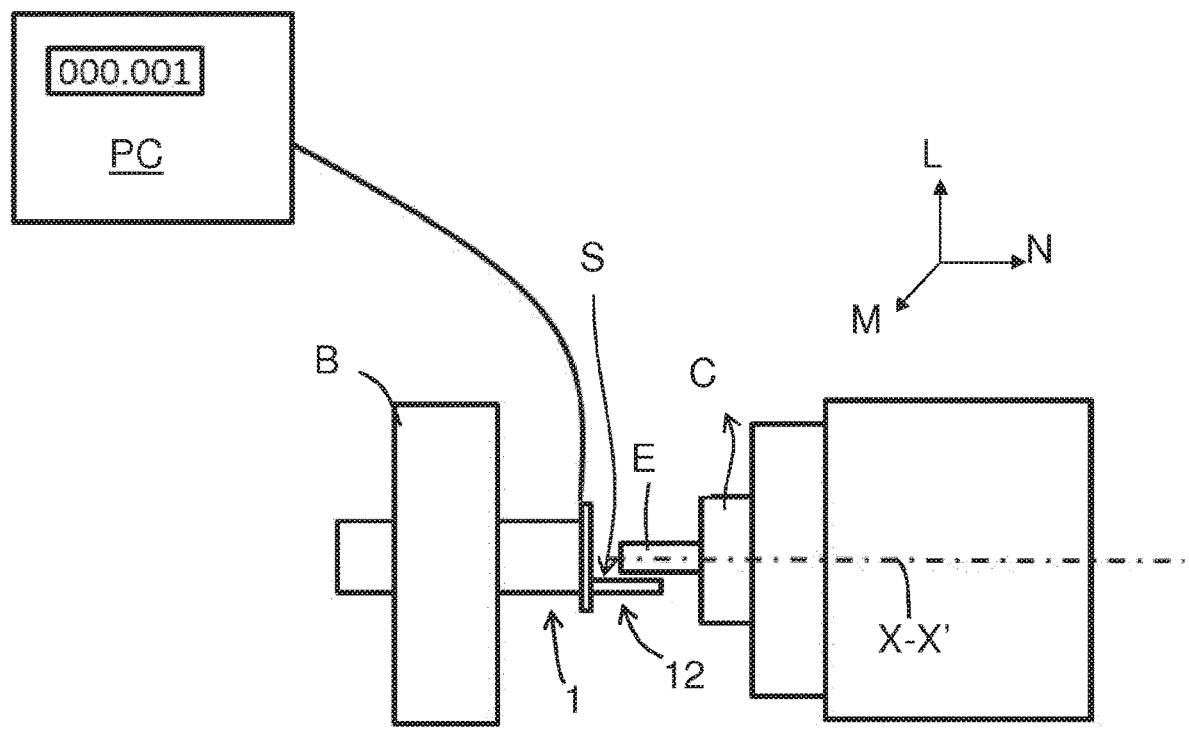
FIG. 6 schematically shows the implementation of the inventive accessory according to the inventive method.

The use of the centering accessory 1 according to the invention will now be described in reference to FIG. 6 in the context of the centering of a tool on the rotation axis X-X' of a rotating guide bush of a machining accessory such as a digital lathe.

The centering accessory 1 makes up a probe-holder, the body 11 of which is suitable for being positioned on a tool-holder spindle B instead of a machining accessory that one wishes to center around the axis X-X' of the rotating guide bush C by adjustment with respect to a benchmark part borne on the rotating guide bush. The head 12 of the accessory 1 makes it possible to support a probe S wedged on the positioning member 121 and connected to an electronic measuring device PC for processing the values measured by said measuring probe S and to determine the movements to be made by the tool-holder spindle along 3 axes L,M,N perpendicular to one another with respect to the axis X-X' of the rotating guide bush. Once these movements are determined, the corresponding values are entered into the control system of the machining appliance by an operator or directly electronically transferred to the latter by the acquisition and calculating means if applicable. The tool-holder spindle is then moved accordingly, and it suffices to place the tool in the spindle to subsequently proceed with the machining.

In practice, in a first step a), the measuring probe S is fastened in the hollow 129 of the positioning member 121 of the head 12 of the centering accessory 1.

In a second step b), the body 11 of the accessory is inserted into the tool-holder spindle, then in a $3^{rd}$ step c), the tool-holder spindle is moved to bring the measuring probe across from a benchmark E on the rotating guide bush C.

In a $4^{th}$ step d), the head 12 of the accessory is moved on the body 11 to place the measuring probe S in n successive measuring positions that are equidistant from one another, n being an integer greater than 1 and performing a distance measurement between the probe S and the benchmark in each position. These positions may in particular be identified easily by the operator when the head 12 and the body 11 of the accessory 1 comprise means for adjusting the angular position as previously described.

The measured values are next used in a step e) to determine the necessary movements relative to the axis X-X' along 3 orthogonal axes based on values acquired during n measurements such that the axis F-F' of the body of the accessory is aligned with the axis X-X'.

Lastly, in a step f), the position of the tool-holder is adjusted relative to the axis X-X' based on movements determined in step e).

The previous steps are for example carried out manually by an operator. The latter also verifies that the measuring probe S is positioned at an optimal distance, for example less than 1 mm from the benchmark, before performing the measurements.

At the end of these operations, the accessory 1, and more particularly the axis F-F' of the body 11 of the latter, is therefore centered with very high precision on the axis X-X'. It then suffices to remove the accessory from the tool-holder spindle and to replace it with a machining accessory to be able to machine a part held on the rotating guide bush in place of the benchmark with excellent precision.

If necessary, it is possible to reiterate the centering operations for as many tools on as many tool-holder spindles as necessary before beginning the machining operations.

It should also be noted that it is advantageously possible to provide a plurality of bodies 11 with different diameters making it possible to use the accessory with any type of tool-holder spindle, the head 12 of the accessory being adjustable indifferently on all of these different bodies so as to guarantee an identical implementation of the centering method irrespective of the body used.

The accessory 1 according to the invention may thus also be proposed in the form of a centering kit comprising a head 12 and a plurality of bodies 11 with different diameters and/or in a centering assistance device further comprising a probe S or a set of probes S and processing means capable of cooperating with the measuring probe to acquire and process the values measured by said measuring probe during the implementation of the centering method according to the invention.

The invention claimed is:

1. An accessory for centering a tool or a tool-holder spindle in a rotating guide bush around a fixed axis X-X' of a machining appliance, comprising: a straight body with longitudinal axis F-F' comprising, at a first end, an alignment member for aligning said axis F-F' with the axis X-X' of the rotating guide bush and, at a second end, a head mounted rotating around the axis F-F' and comprising a positioning member able to receive a positioning tool.

2. The accessory according to claim 1, wherein the head comprises an alignment shaft on the axis F-F' of the body, said shaft being secured with the positioning member and able to be inserted into a blind bore with complementary dimensions formed along the axis F-F' at the second end of the body.

3. The accessory according to claim 1, wherein the head and the second end of the body comprise reversible connecting means such that the head is removable from said second end of the body.

4. The accessory according to claim 3 wherein the reversible connecting means comprise at least one deformable key and at least one recess for inserting said key, said deformable key and said recess being arranged respectively on the head and the second end of the body or vice versa.

5. The accessory according to claim 3, wherein the head comprises an intermediate cylindrical shoulder between the alignment shaft and the support member, said shoulder having an outer diameter larger than the outer diameter of the shaft, and wherein the body comprises an intermediate spot facing between an open end of the bore and the second end of the body, said spot facing being such that said shoulder penetrates at least partially in said spot facing when the head is mounted at the second end of the body.

6. The accessory according to claim 5, wherein the reversible connecting means are arranged in an outer cylindrical surface of the shoulder and an inner cylindrical surface of the spot facing.

7. The accessory according to claim 6, wherein the reversible connecting means comprise at least one ball key deformable perpendicular to a shared axis of revolution of the shaft and the shoulder of the head and at least one recess for inserting said key formed in an inner cylindrical surface of the spot facing, or vice versa.

8. The accessory according to claim 7, wherein the ball key comprises a ball mounted suspended on a spring in a piercing perpendicular to the shared axis R-R' of the shaft and the shoulder of the head, the outer diameter of the emerging end of said piercing aligned with the outer cylindrical surface of the shoulder being reduced so as to allow a partial protrusion of the ball at the surface of said shoulder.

9. The accessory according to claim 7, further comprising a plurality of deformable keys distributed in a regular angular arrangement on the surface of the shoulder and a corresponding plurality of recesses for each of the keys formed in the inner cylindrical surface of the spot facing of the body.

10. The accessory according to claim 7, wherein the at least one recess is formed by an annular groove with axis F-F' in the inner cylindrical surface of the spot facing of the body.

11. The accessory according to claim 1, wherein the positioning member comprises a stop plate against the second end of the body and a shimming housing for one said positioning tool.

12. The accessory according to claim 11, wherein the shimming housing is formed in a finger secured to the stop plate and extending perpendicular thereto.

13. The accessory according to claim 1, further comprising means for adjusting the angular position of the head on the body around the axis F-F'.

14. The accessory according to claim 13, wherein the means for adjusting the angular position of the head on the body comprise at least one graduated scale and a slider formed across from one another respectively on the body and the head, or vice versa.

15. A method for centering a tool or a tool-holder spindle on the rotation axis X-X' of a rotating guide bush of a machining appliance using a centering accessory according to claim 1, the method comprising:
  a) fastening a measuring probe in the member for positioning the head of the centering accessory,
  b) inserting the body of the accessory into the tool-holder spindle,
  c) moving the tool-holder spindle to bring the measuring probe across from a benchmark on the rotating guide bush,
  d) moving the head of the accessory to place the measuring probe in n successive measuring positions that are equidistant from one another, n being an integer greater than 1 and performing a distance measurement between the probe and the benchmark in each position,
  e) determining the necessary movements relative to the axis X-X' along 3 orthogonal axes based on values acquired during n measurements such that the axis F-F' of the body of the accessory is aligned with the axis X-X',
  f) adjusting the position of the tool-holder spindle relative to the axis X-X' based on movements determined in step e).

16. The centering method according to claim 15, wherein the probe is connected to an electronic measuring and control device, if applicable able to be connected to the electronic control system of the machining appliance in order to control the positioning adjustment of the tool automatically after each measurement.

17. A device for assisting with the centering of a machining appliance comprising a device with a rotating guide bush, comprising:
  an accessory according to claim 1, a measuring probe able to be positioned on the member for positioning the head of the tool, an electronic measuring device cooperating with the measuring probe to process the values measured by the measuring probe.

\* \* \* \* \*